H. L. INGERSOLL.
BOOSTER MOTOR FOR LOCOMOTIVES.
APPLICATION FILED OCT. 2, 1917. RENEWED FEB. 16, 1920.
1,375,293.
Patented Apr. 19, 1921.
2 SHEETS—SHEET 1.
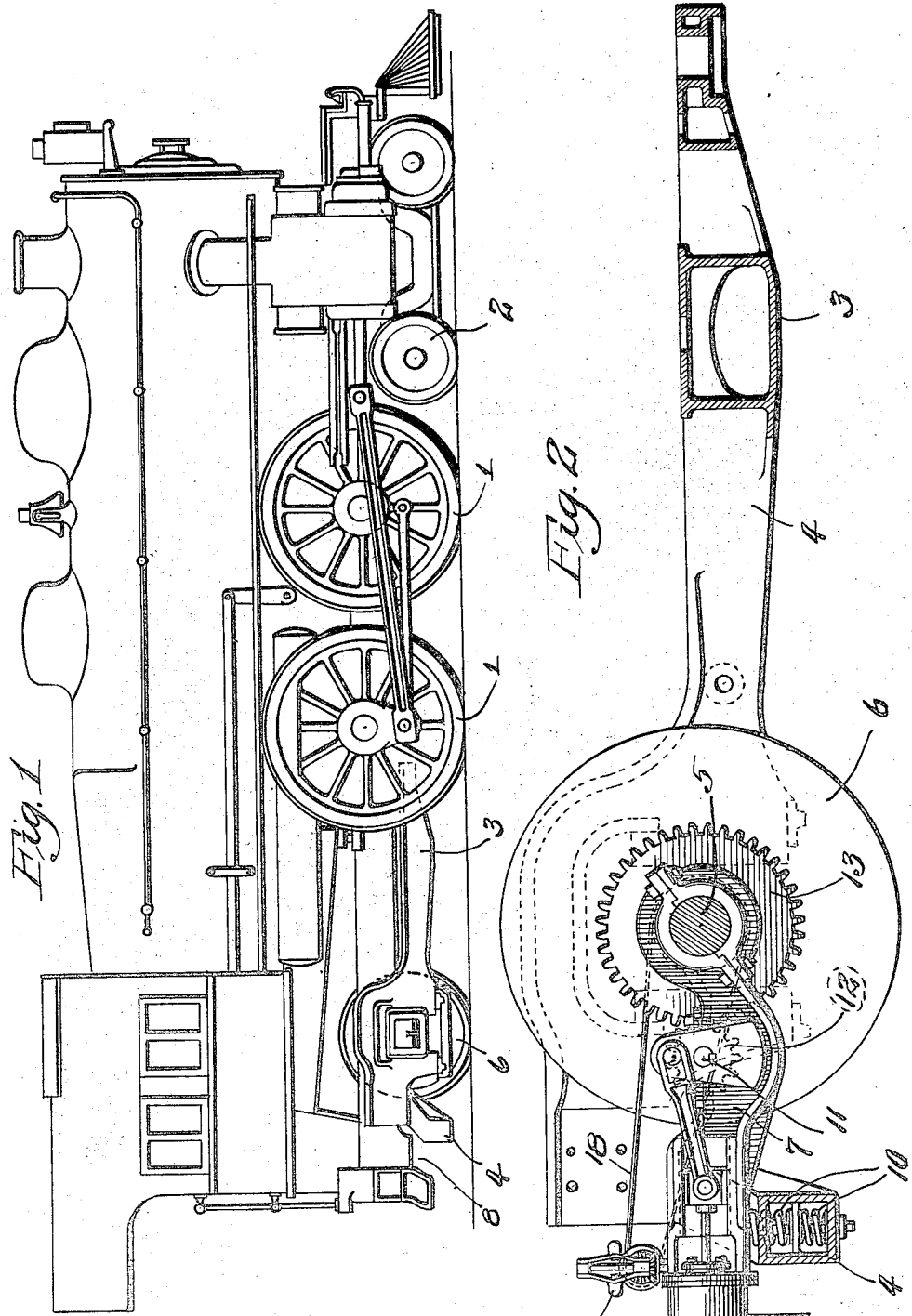
Inventor
Howard L. Ingersoll
By F. M. Cornwall, Atty.

H. L. INGERSOLL.
BOOSTER MOTOR FOR LOCOMOTIVES.
APPLICATION FILED OCT. 2, 1917. RENEWED FEB. 16, 1920.
1,375,293.
Patented Apr. 19, 1921.
2 SHEETS—SHEET 2.
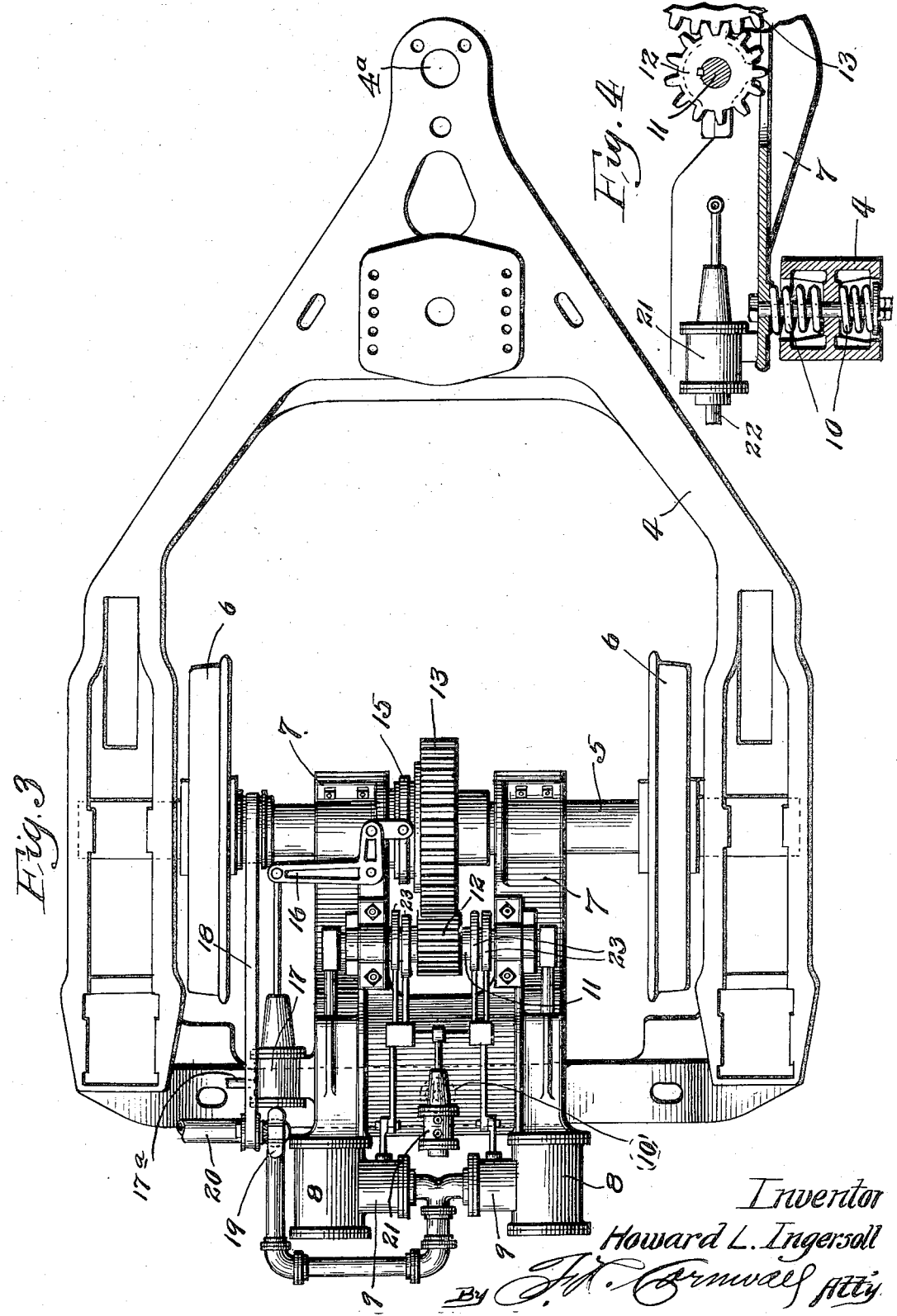
Inventor
Howard L. Ingersoll

UNITED STATES PATENT OFFICE.

HOWARD L. INGERSOLL, OF WHITE PLAINS, NEW YORK.

BOOSTER-MOTOR FOR LOCOMOTIVES.

1,375,293.      Specification of Letters Patent.      Patented Apr. 19, 1921.

Application filed October 2, 1917, Serial No. 194,335. Renewed February 16, 1920. Serial No. 359,201.

*To all whom it may concern:*

Be it known that I, HOWARD L. INGERSOLL, a citizen of the United States, residing at White Plains, New York, have invented a certain new and useful Improvement in Booster-Motors for Locomotives, of which the following is a full, clear, and exact description, such as will enable others skilled in the art to which it appertains to make and use the same, reference being had to the accompanying drawings, forming part of this specification, in which—

My invention relates to locomotives and its principal object is to increase the tractive power of a locomotive, especially in starting and in running at relatively low speeds, up grades for example, by providing the locomotive with an auxiliary or "booster" motor suitably controlled which, when put into operation, applies power to wheels of the locomotive other than the main driving wheels.

In view of the complexity of the mechanisms composing the modern steam locomotive and its usual adjuncts, the functional relationship of these mechanisms and the necessity for structural compactness, it is a matter of fundamental importance that if a locomotive is to be provided with a booster motor, the booster should be so placed on the locomotive and its controlling devices so arranged with reference to the mechanisms of the locomotive that the installation of the booster will necessitate as little rearrangement as possible of the locomotive mechanisms and appurtenances and the operation of the booster as little interference with or disturbance of the usual control and functioning of the main driving means and the mechanisms associated therewith as possible.

This invention is not concerned with the control of the booster motor, a control system for the booster in which the control of the booster is subordinated and related to the control of the main driving means being described and claimed in my application Serial No. 299,037 (patented as Patent No. 1,339,395, May 11, 1920) and another system having similar characteristics being made the subject matter of an application, Serial No. 424049, filed November 15, 1920, as a division hereof. The present invention relates especially to the location of the booster on the locomotive, and the means employed for supporting the same and for operatively connecting it by a releasable driving connection to the axle which it is designed to drive as occasion requires.

The invention is illustrated in a preferred embodiment in the accompanying drawings, in which, Figure 1 is a side elevation of a locomotive of the Atlantic type having a booster motor installed thereon;

Fig. 2 is a longitudinal sectional view of the trailer truck of the locomotive with which the booster is associated;

Fig. 3 is a plan view of the trailer truck and booster; and

Fig. 4 is a detail vertical sectional view showing the flexible mounting of the booster frame or bed plate on the truck frame.

Referring to the drawings the numerals 1 designate the main driving wheels of the locomotive, 2 is the leading truck and 3 the trailer truck. Both of these trucks 2 and 3, as usual, are pivotally connected with the frame of the locomotive so as to have swinging movements to accommodate the locomotive to curves of the track. This construction is well known and I do not deem it necessary to show the details therefor. The trailer truck comprises a frame 4 in which is mounted in suitable journal boxes an axle 5, said axle carrying wheels 6. The forward end of frame 4 is provided with an opening 4ª through which a king pin may pass forming the pivotal connection of the trailer truck to the frame of the locomotive. On the axle is swung a frame 7 providing a support for cylinders 8 to which are conjoined valve boxes 9. Considerable flexibility is needed on a trailer truck on account of the variation of movement of the journal boxes and truck frame, and to provide this required flexibility the base frame 7 is hinged or otherwise flexibly connected to the axle and supported on the truck frame transom by means of springs 10 (Fig. 4) arranged so that both upward and downward movements of the motor frame are cushioned, permitting absorption of shocks due to road bed inequalities and to the labor of the booster engine. The motor frame is thus swung from the axle which it drives and consequently the motor driving connections are unaffected by the radial and other movements of the truck under service conditions.

The motor shown in the drawings for the purpose of illustrating the invention is a steam actuated reciprocating engine controlled by certain steam operated devices forming the subject matter of the copending application above referred to. The pistons or cylinders 8 are connected by rods to a well known type of cross head which in turn is provided with a pitman connected to crank arms on a shaft 11 carrying a pinion 12 which latter meshes with a gear 13 loosely mounted on axle 5. The gear is connected to the axle by means of a clutch 15 operated by a bell crank 16 under control of fluid pressure in a cylinder 17. 20 designates a steam pipe for supplying motive fluid to the booster cylinders 8 and also to the clutch operating cylinder 17, and 19 a centrifugal governor driven by belt 18 from axle 5 for automatically shutting off inflow through pipe 20 when the locomotive reaches a determinate speed. 17ᵃ is a pipe leading to the cylinder 17 whereby the clutch may be shifted independently of the governor. These features of the control system are referred to only incidentally as they are not claimed therein.

A cylinder 21 adapted to receive pressure fluid from any suitable source through pipe 22 controls the valve gearing for reversing the valves in valve boxes 9. The eccentrics of this valve gearing are shown at 23. 24 is a pipe for carrying off exhaust steam and water of condensation from the booster engine.

By the construction above described the booster is placed so as not to interfere in any way with any of the usual working parts of the locomotive and thus can be installed without inconvenience on existing locomotives. It is carried by one of the trucks of the locomotive, the wheels of which are normally idle, that is mere weight supporting wheels, so that the weight of the booster is not a load on the main drivers which, assuming the locomotive to be properly designed, are already carrying a load proper for giving them their intended tractive effect. The booster, in other words, does not interfere with the normal functioning of the locomotive nor tend to throw the locomotive out of balance. The booster engine must necessarily be smaller and more compact than the main driving mechanism. But it is designed to drive wheels of smaller diameter than the main driving wheels. The booster is, therefore, capable of exerting great force in comparison with its relatively small size when the locomotive is started or is laboring up a hard grade. It is not intended that the booster should be operated when the locomotive is running at high speeds. Hence there is no disadvantage but on the contrary a positive advantage in having it arranged to drive wheels of relatively small diameter.

I claim:

1. In combination with a locomotive having a main frame, main driving wheels and a truck comprising a truck frame having a pivotal relation with the main frame and an axle and wheels which with the other wheels of the locomotive normally carry the weight of said locomotive; of a steam operated booster motor supported on said truck, and a releasable driving connection between said booster motor and said axle.

2. The combination of the main driving wheels of a locomotive and their driving mechanism, a frame supported in part by said wheels, a radially movable truck for supporting a part of the weight of said frame, wheels mounted in said truck which normally support part of the weight of the frame transmitted through the truck, a booster motor whose weight is carried by said last mentioned wheels, and means providing a driving connection between said booster motor and said last mentioned wheels which may be made effective or ineffective.

3. In combination with a locomotive having main driving wheels and steam operated means for driving the same, a trailer truck supporting a part of the weight of the locomotive, and a booster motor for aiding the main driving means or starting the locomotive and propelling the same at low speeds which is adapted to drive the wheels of the trailer truck.

4. The combination with a locomotive having main driving wheels, means for driving the same, and a trailer truck comprising an axle with its wheels and a frame having a floating relation with the axle; of a booster motor supported on and having a driving connection with said axle, and means for providing a flexible support for the booster motor on said truck frame.

5. The combination with a locomotive having main driving wheels, means for driving the same, and a trailer truck comprising an axle with its wheels and a frame carried by said axle and wheels and having a pivotal relationship with the locomotive; of a booster motor supported on and having a driving connection with said axle, and means for providing a flexible support for the motor on said truck frame.

6. The combination with a locomotive having main driving wheels, means for driving the same, a trailer truck comprising a frame having a pivotal relation with the locomotive, a pair of wheels and an axle, and journal boxes for said axle movable with respect to said frame; of a booster motor supported by and having a driving connection with said axle, and means providing a flexible support for the motor on said frame.

7. The combination with a locomotive having main driving wheels, means for driving the same, and a trailer truck comprising an axle with its wheels and a frame having a floating relation with the axle; of a booster motor supported on and having a driving connection with said axle, and means for providing a flexible support for the booster motor on said truck frame comprising springs arranged so as to be stressed by upward and downward movements respectively, of the motor in relation to the truck frame.

8. The combination with a locomotive having main driving wheels, means for driving the same, a trailer truck comprising a frame having a pivotal relation with the locomotive, a pair of wheels and an axle, and journal boxes for said axle movable with respect to said frame; of a booster motor supported by and having a driving connection with said axle, and means providing a flexible support for the motor on said frame comprising springs arranged so as to be stressed by upward and downward movements respectively, of the motor in relation to the truck frame.

9. The combination with a locomotive having main driving wheels, means for driving the same, a trailer truck comprising a frame having a pivotal relation with the locomotive, a pair of wheels and an axle, and journal boxes for said axle movable with respect to said frame; of a booster motor having a driving connection with said axle, a frame carrying said motor having bearings on said axle, and means providing a flexible support for the motor frame on the truck frame.

10. The combination with a locomotive having main driving wheels, means for driving the same, a trailer truck comprising a frame having a pivotal relation with the locomotive, a pair of wheels and an axle, and journal boxes for said axle movable with respect to said frame; of a booster motor, a frame to carry said motor having bearings on said axle, means providing a flexible support for the booster motor frame upon the truck frame and intermeshing gears on the axle and carried by the frame for driving said axle from said motor.

11. The combination with a locomotive having main driving wheels, means for driving the same, and a trailer truck comprising a frame pivoted at its forward end to oscillate on a vertical axis, journal boxes associated with the frame, and an axle with wheels associated with said journal boxes to support the frame, of a booster motor, a frame carrying the same having a pair of bearings spaced apart engaging said axle, resilient means at the other end thereof for supporting said motor frame on the truck frame, and power transmission means carried by said axle and motor frame for applying power from the motor to the axle at a point between the bearings of the motor frame thereon.

12. The combination with a locomotive having main driving wheels, means for driving the same and a normally idle axle with its wheels; of a booster motor adapted to drive said axle in starting and at low speeds of the locomotive, a frame for carrying the motor having bearings on said axle, and means for providing a flexible support for the motor frame on a part of the locomotive.

13. The combination with a locomotive having main driving wheels, means for driving the same and a normally idle axle with its wheels; of a booster motor adapted to drive said axle in starting and at low speeds of the locomotive, a frame for carrying the motor having a pair of spaced bearings at one end engaging said axle, and means at the other end providing a flexible support for the frame on a part of the locomotive.

14. The combination with a locomotive having main driving wheels, means for driving the same, and a normally idle axle with its wheels; of a booster motor adapted to drive said axle in starting and at low speeds of the locomotive, a frame for carrying the motor having a pair of spaced bearings at one end engaging said axle, and means for flexibly supporting the other end of said frame at a single point on a part of the locomotive.

15. The combination with a locomotive having main driving wheels, means for driving the same and a normally idle axle with its wheels; of a booster motor adapted to drive said axle in starting and at low speeds of the locomotive, a frame for carrying the motor having a pair of spaced bearings at one end engaging said axle, means at the other end providing a flexible support for the frame on a part of the locomotive, and a pair of gears one on said axle between said bearings and the other on the frame providing a driving connection between the motor and said axle.

16. The combination with a locomotive having main driving wheels, means for driving the same, a normally idle axle with its wheels, and a truck frame supported by said axle; of a booster motor to drive said axle in starting and at low speeds of the locomotive, a frame carrying said motor having bearings on said axle, and means providing a flexible support for the motor frame on the truck frame.

17. The combination with a locomotive having main driving wheels, means for driving the same, a normally idle axle with its wheels, and a truck frame supported by said axle; of a booster motor to drive said axle in starting and at low speeds of the locomotive, a frame carrying said motor having a pair of spaced bearings at one end engaging said axle, and means for flexibly supporting the other end of said motor frame at a single point on the truck frame.

18. The combination with a locomotive having main driving wheels, means for driving the same, a normally idle axle with its wheels, and a truck frame supported by said axle; of a booster motor to drive said axle in starting and at low speeds of the locomotive, a frame carrying said motor having a pair of spaced bearings at one end engaging said axle, and resilient means for supporting the other end of said motor frame at a single point on the truck frame.

19. The combination with a locomotive having main driving wheels, means for driving the same, a normally idle axle with its wheels, and a truck frame supported by said axle; of a booster motor to drive said axle in starting and at low speeds of the locomotive, a frame carrying said motor having a pair of spaced bearings at one end engaging said axle, means for flexibly supporting the other end of said motor frame at a single point on the truck frame, a gear on said axle between said spaced bearings, a shaft on the motor frame adapted to be driven by the motor, and a gear on said shaft adapted to mesh with the gear on the axle.

20. In combination, a locomotive having an axle and its wheels, a motor frame having a pair of spaced bearings engaging said axle, and flexibly supported on another part of the locomotive, a steam actuated reciprocating booster motor carried on said frame, and means for transmitting power from said motor to a point on the axle between said bearings.

21. In combination a steam propelled locomotive having main driving wheels, propelling mechanism therefor and a trailer truck having wheels of smaller diameter than the main driving wheels, which at all times carry a part of the weight of the locomotive; a steam propelled booster motor to aid the main driving means in starting the locomotive and propelling it at low speeds; and a releasable driving connection between said booster motor and said last named wheels.

22. In combination, a locomotive having an axle and its wheels, a motor frame having a pair of spaced bearings engaging said axle and flexibly supported on another part of the locomotive, a booster motor carried on said frame, and means for transmitting power from said motor to a point on the axle between said bearings.

23. In combination, a locomotive having an axle and its wheels, a motor frame having bearings on said axle and flexibly supported on another part of the locomotive, a steam operated booster motor carried on said frame, a gear on said axle, a shaft on the frame adapted to be driven by the motor, a gear on said shaft adapted to mesh with the gear on the axle, and eccentrics on the shaft for actuating the valves of the booster motor.

24. In combination with the main driving wheels of a locomotive and steam operated means for driving the same, a trailer truck frame having a pivotal relation at its forward end with the locomotive for radial movement, an axle and wheels, and a booster motor for aiding the main driving means in starting the locomotive and propelling the same at low speeds adapted to drive the wheels of said trailer truck.

25. In combination with the main driving wheels of a locomotive and steam operated means for driving the same, a trailer truck frame having a pivotal relation at its forward end with the locomotive for radial movement, an axle and wheels on which the trailer truck frame is resiliently supported, and a booster motor for aiding the main driving means in starting the locomotive and propelling the same at low speeds, adapted to drive the wheels of said trailer truck.

26. In combination with the main driving wheels of a locomotive and steam operated means for driving the same, a trailer truck frame having a pivotal relation at its forward end with the locomotive for radial movement, an axle and wheels, a booster motor, and a releasable driving connection between the booster motor and axle.

27. In combination with the main driving wheels of a locomotive and steam operated means for driving the same, a trailer truck having a pivotal relation with the locomotive and adapted to resiliently carry a part of the weight thereof and comprising truck wheels, and a booster motor for driving said truck wheels to aid the main driving means in starting the locomotive and propelling the same at low speeds.

In testimony whereof I hereunto affix my signature in the presence of two witnesses, this 24th day of September, 1917.

HOWARD L. INGERSOLL.

Witnesses:
  B. B. MILNER,
  Q. J. DYNAN.

DISCLAIMER 1,375,293.—*Howard L. Ingersoll*, White Plains, N. Y. BOOSTER-MOTOR FOR LOCOMOTIVES. Patent dated April 19, 1921. Disclaimer filed October 23, 1934, by the patentee, and the assignees, *Locomotive Booster Company, and Franklin Railway Supply Company*.

Hereby enter this disclaimer to that part of the claims in said specification which is in the following words, to wit:

"13. The combination with a locomotive having main driving wheels, means for driving the same and a normally idle axle with its wheels; of a booster motor adapted to drive said axle in starting and at low speeds of the locomotive, a frame for carrying the motor having a pair of spaced bearings at one end engaging said axle, and means at the other end providing a flexible support for the frame on a part of the locomotive.

"14. The combination with a locomotive having main driving wheels, means for driving the same, and a normally idle axle with its wheels; of a booster motor adapted to drive said axle in starting and at low speeds of the locomotive, a frame for carrying the motor having a pair of spaced bearings at one end engaging said axle, and means for flexibly supporting the other end of said frame at a single point on a part of the locomotive.

"15. The combination with a locomotive having main driving wheels, means for driving the same and a normally idle axle with its wheels; of a booster motor adapted to drive said axle in starting and at low speeds of the locomotive, a frame for carrying the motor having a pair of spaced bearings at one end engaging said axle, means at the other end providing a flexible support for the frame on a part of the locomotive, and a pair of gears one on said axle between said bearings and the other on the frame providing a driving connection between the motor and said axle."

"17. The combination with a locomotive having main driving wheels, means for driving the same, a normally idle axle with its wheels, and a truck frame supported by said axle; of a booster motor to drive said axle in starting and at low speeds of the locomotive, a frame carrying said motor having a pair of spaced bearings at one end engaging said axle, and means for flexibly supporting the other end of said motor frame at a single point on the truck frame.

"18. The combination with a locomotive having main driving wheels, means for driving the same, a normally idle axle with its wheels, and a truck frame supported by said axle; of a booster motor to drive said axle in starting and at low speeds of the locomotive, a frame carrying said motor having a pair of spaced bearings at one end engaging said axle, and resilient means for supporting the other end of said motor frame at a single point on the truck frame."

[*Official Gazette November 13, 1934.*]